April 26, 1927.   1,626,333

F. E. FAIN ET AL

FISHING ROD APPLIANCE

Filed June 10, 1926

Frank E. Fain
Robert W. Sprigg   INVENTORS

BY Loyal J. Miller
ATTORNEY

Patented Apr. 26, 1927.

1,626,333

UNITED STATES PATENT OFFICE.

FRANK E. FAIN AND ROBERT W. SPRIGG, OF OKLAHOMA CITY, OKLAHOMA.

FISHING-ROD APPLIANCE.

Application filed June 10, 1926. Serial No. 115,051.

Our invention relates to improvements in fishing rod appliance.

The object of the invention is to provide a device of the character described which will be strong, durable, inexpensive, easily manufactured, easily applied, novel, and of great utility. It will assist in catching the fish which bite on lines attached to rods mounted on this device. Their use will enable one fisherman to attend at the same time many more poles and lines than without the device.

Figure 1:
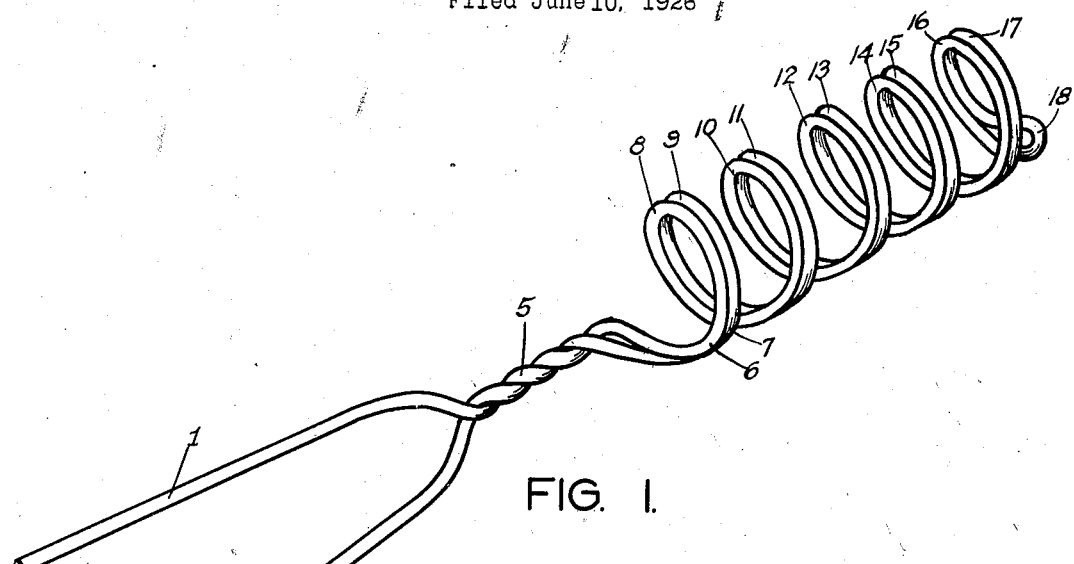
Figure 2:
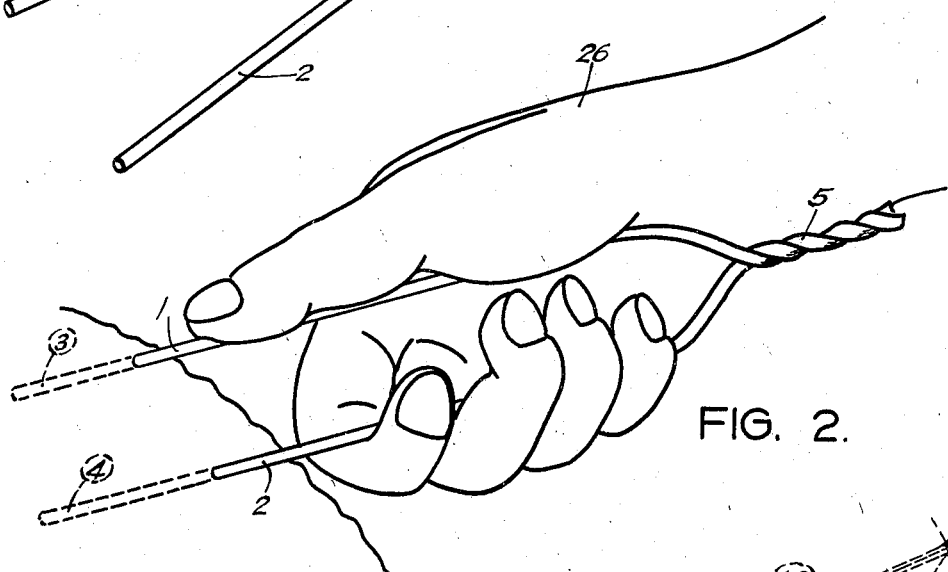
Figure 3:
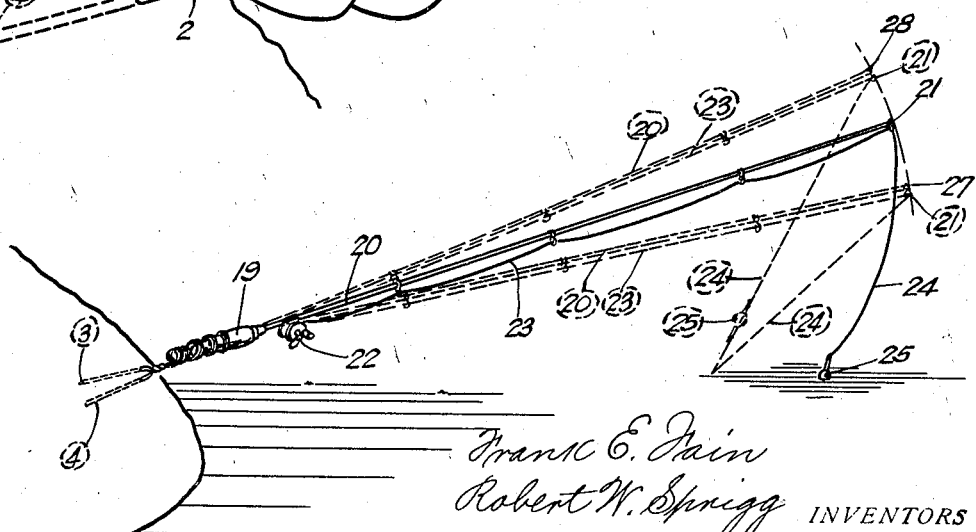

Other objects will further appear from the specification, claim, and accompanying one-sheet drawing, of which, Figure 1 is a perspective view of the device; Figure 2 is a fragmentary perspective view showing the position of inserting prongs in the soil; Figure 3 is a perspective view of the device holding the fishing rod and line in position.

Like characters of reference designate like parts in all the figures.

It is known to those familiar with the art to which our invention pertains that the setting of poles by the usual and ordinary stick, rock, or board supports result in the line often falling in the water and the pole falling to the ground upon a slight gust of wind, or a minor "pull" of a fish on the hook at the end of the line. This requires an almost constant holding of the pole in the hands, which in time becomes tiresome, and the objects of fishing, to wit, rest and pleasure, are thereby turned into discomfort, and irritation. In fishing with a reel and line on the ordinary metallic, or jointed metallic pole it is almost impossible for a person to attend more than one fishing outfit; there is usually no way of setting them in the mud to set the pole up; and to lay it down in the sand or dirt tends to get the silk line, and the reel filled with dust, dirt and grit. As a result one is almost compelled to hold that kind of a fishing outfit in his hands all the time. With the device covered by our invention the standard can be placed in the soil practically anywhere and the butt end of the fishing rod can be tightly and securely placed in the double coiled portion. This holds the rod taut at any given angle desired, and permits the pole to be held in such angle until a "strike" or "pull" on the line attached to the pole occurs. As soon as the "strike" or "pull" is made the pole being pliable will be bent towards the direction in which the fish swims or "pulls", and the tension on the outer end of the pole is communicated to the butt end of the pole held in the socket in the upper end of the device, and it, as well as the pole, being resilient causes the butt end to follow the vibrating motion of the pole until the pole reaches the end of its throw, then the rebound of the pole and the rebound action of the spring draws the pole back further than its normal position, thereby causing an automatic jerk on the line and a movement of the hook thereby snaring the fish.

In operation the ends 1, 2, of the metallic spring wires are pressed together by the hand 26 as shown in Figure 2, and thrust into the ground as shown by 3 and 4, at which time they are then released. The pressing of these ends to a position wherein they are parallel causes them to be easily thrust into the soil, or ground, and the natural position of these ends 1 and 2 is shown in Figure 1; after their release by the hand their tautness and resilience cause them to press outwardly, and to hold the device firmly in the ground. At the juncture of prongs 1 and 2 they are twisted tightly together for several coils as at 5 in a reverse manner as to the turning of the double coils 6, 7, 8, 9, 10, 11, 12, 13, 14, 15, 16, 17. Said double coils last named are so coiled as to leave a space between the various plurality series of double coils giving more resilience to the handle holding coils, at its outer end 18 it is looped so as to make a round surfaced end.

When the prongs 1 and 2 are pressed together stuck into the soil and released as at 3 and 4, the line 23 is released from reel 22 and cast into the water as desired and the outer end 24 of line 23 is allowed to depend from outer end 21 of a pole 20 as is shown by float 25 (if a float is used); the handle 19 of said pole 20 is then inserted in the outer end of the double coils and there remains taut. When a "strike" or "pull" is made by a fish on the baited hook (not shown) the float 25 and line 24 are pulled in the direction as illustrated in Figure 3 at 24 and the end 21 of pole 20 is drawn downwardly as shown at 27. If the fish then releases any on its hold or changes the direction of its course in the water, the pole, by its tautness and resilience and by the resilience and tautness of the device surrounding the handle, is brought back to a position 28 beyond its normal position of its end 21. This causes automatically the same action of the hook as a "jerk" by the fisherman would, and automatically causes the hooking or snaring of the fish. A plurality of rods and lines so used can be set and handled by one fisherman. After a fish is hooked, or snared there will not be the necessity of hurrying to pull the fish to shore as there would be if the pole was being handled by hand, or if there was a likelihood of the pole being jerked out of its socket or seat. The pole remaining in its tense position would tend to resist the fish's pull each time it would go to the end of the throw of the line.

From the description and the accompanying one sheet drawing, and the specification, the advantages of construction, application and manufacture will be apparent to those skilled in the art to which our invention pertains. We have entered into a detailed description of the construction and relative arrangement of the parts embraced in the present and preferred embodiment of our invention in order to impart a full, clear and exact understanding of the said embodiment. We do not desire, however, to be understood as confining ourselves to the specific construction and relative arrangement of parts inasmuch as in the future practice of the invention various changes and modifications may be made such as fall within the scope of our invention as defined in our appended claim.

Having thus described the invention what is claimed and desired to be secured by Letters Patent, is:

A device of the character described, comprising a doubled metallic resilient wire coiled at the outer end so as to form a plurality of loops with a space between each set; a medial stem formed integrally of said wires twisted tightly together and in the opposite direction to the twisting of said coils; two prongs formed of the ends of said wires and flared outwardly from the end of said stem farthest from said coils.

FRANK E. FAIN.
ROBERT W. SPRIGG.